US011601223B2

(12) United States Patent
Sun et al.

(10) Patent No.: US 11,601,223 B2
(45) Date of Patent: Mar. 7, 2023

(54) SYSTEMS AND METHODS FOR HARQ TRANSMISSION AND RETRANSMISSION USING MULTIPLE CODE WORDS

(71) Applicant: QUALCOMM Incorporated, San Diego, CA (US)

(72) Inventors: Jing Sun, San Diego, CA (US);
Xiaoxia Zhang, San Diego, CA (US);
Piyush Gupta, Bridgewater, NJ (US);
Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/033,642

(22) Filed: Jul. 12, 2018

(65) Prior Publication Data

US 2019/0058553 A1 Feb. 21, 2019

Related U.S. Application Data

(60) Provisional application No. 62/547,456, filed on Aug. 18, 2017.

(51) Int. Cl.
*H04B 7/0456* (2017.01)
*H04W 72/04* (2009.01)
(Continued)

(52) U.S. Cl.
CPC .......... *H04L 1/1812* (2013.01); *H04L 1/1861* (2013.01); *H04L 1/1893* (2013.01); *H04W 72/042* (2013.01); *H04L 5/0055* (2013.01)

(58) Field of Classification Search
CPC ................. H04L 1/1896; H04L 1/0057; H04L 5/0044; H04L 5/0055; H04L 1/1864;
(Continued)

(56) References Cited

U.S. PATENT DOCUMENTS 9,246,640 B2 1/2016 Zhang et al.
2008/0225965 A1* 9/2008 Pi ........................ H04L 1/0003
375/260

(Continued)

FOREIGN PATENT DOCUMENTS

CN 101651532 A 2/2010
CN 101809922 A 8/2010
(Continued)

OTHER PUBLICATIONS

Ericsson: "On Retransmission Decoder Throughput Issues and CBG-based HARQ Protocol", 3GPP Draft, R1-1709109, 3rd Generation Partnership Project (3GPP), Mobile Competence Centre, 650, Route Des Lucioles, F-06921 Sophia-Antipolis Cedex, France vol. RAN WG1, No. Hangzhou, May 15, 2017-May 19, 2017 May 14, 2017 (May 14, 2017), XP051274267, pp. 1-4, Retrieved from the Internet: URL:http://www.3gpp.org/ftp/Meetings 3GPP_SYNC/ RAN1/Docs/ [retrieved on May 14, 2017].

(Continued)

*Primary Examiner* — Khaled M Kassim
*Assistant Examiner* — Jason A Harley
(74) *Attorney, Agent, or Firm* — Arent Fox LLP

(57) ABSTRACT

A user equipment (UE) in communication with a base station may utilize multiple code word (MCW) transmissions within a hybrid automatic repeat request (HARQ) process. An original transmission has a first transport block allocated to a first code word and a second transport block allocated to a second code word. Each transport block includes multiple code blocks grouped into code block groups. The UE receives a negative acknowledgement indicating that a subset of the code block groups were not successfully received. The UE retransmits the subset of the code block groups on at least one of the first code word or the second code word in a retransmission in the HARQ (Continued)

process. At least one code block is retransmitted on a different code word in the retransmission than in the original transmission.

28 Claims, 11 Drawing Sheets

(51) Int. Cl.

| | |
|---|---|
| *H04W 72/12* | (2009.01) |
| *H03M 13/00* | (2006.01) |
| *H03M 13/29* | (2006.01) |
| *H04L 27/26* | (2006.01) |
| *H04W 72/00* | (2009.01) |
| *H04J 13/18* | (2011.01) |
| *H04L 1/1812* | (2023.01) |
| *H04L 1/1867* | (2023.01) |
| *H04L 1/1829* | (2023.01) |
| *H04L 5/00* | (2006.01) |

(58) Field of Classification Search
CPC ...... H04L 1/1621; H04L 1/1854; G06F 11/08; H04W 72/04; H03M 13/6516; H04M 72/0413
USPC .......................................... 370/329; 714/748
See application file for complete search history.

(56) References Cited

U.S. PATENT DOCUMENTS

| | | | | |
|---|---|---|---|---|
| 2010/0074208 | A1* | 3/2010 | Farajidana | H04L 1/1867 370/328 |
| 2013/0010745 | A1* | 1/2013 | Ko | H04B 7/0404 370/329 |
| 2013/0064212 | A1* | 3/2013 | Ogawa | H04L 5/0023 370/329 |
| 2013/0188583 | A1* | 7/2013 | Lan | H04L 1/1809 370/329 |
| 2013/0188590 | A1* | 7/2013 | Aiba | H04L 5/0053 370/329 |
| 2013/0301604 | A1* | 11/2013 | Skov | H04L 5/0023 370/329 |
| 2014/0344638 | A1* | 11/2014 | Taguchi | H04L 1/08 714/748 |
| 2014/0376358 | A1* | 12/2014 | Eder | H04L 1/0057 370/216 |
| 2015/0029970 | A1* | 1/2015 | Niewczas | H04L 1/0006 370/329 |
| 2016/0128056 | A1* | 5/2016 | Jiang | H04L 5/0007 370/329 |
| 2016/0241362 | A1* | 8/2016 | El-Khamy | H04L 1/1835 |
| 2016/0285589 | A1* | 9/2016 | Mukkavilli | H04L 1/0041 |
| 2017/0026297 | A1* | 1/2017 | Sun | H04L 1/0067 |
| 2018/0287745 | A1* | 10/2018 | Sun | H04L 1/1864 |
| 2018/0309496 | A1* | 10/2018 | Lee | H04L 5/0053 |
| 2018/0368110 | A1* | 12/2018 | Ying | H04L 5/0044 |
| 2019/0037585 | A1* | 1/2019 | Li | H04L 1/0071 |
| 2019/0207734 | A1* | 7/2019 | Yang | H04L 5/001 |
| 2019/0356430 | A1* | 11/2019 | Cheng | H04L 1/1864 |

FOREIGN PATENT DOCUMENTS

| | | |
|---|---|---|
| TW | 201728111 A | 8/2017 |
| WO | 2011127093 | 10/2011 |

OTHER PUBLICATIONS

Huawei et al., "Discussion on CBG Construction", 3GPP Draft, R1-1709968, 3rd Generation Partnership Project (3GPP), Mobile Competence Centre, 650, Route Des Lucioles, F-06921 Sophia-Antipolis Cedex, France vol. RAN WG1, No. Qingdao, China, Jun. 27, 2017-Jun. 30, 2017, Jun. 26, 2017 (Jun. 26, 2017), XP051299193, 3 Pages, Retrieved from the Internet: URL:http://www.3gpp.org/ftp/Meetings_3GPP_SYNC/RAN1/Docs/ [retrieved on Jun. 26, 2017].
International Search Report and Written Opinion—PCT/US2018/042053—ISA/EPO—dated Oct. 16, 2018.
Mediatek Inc: "Discussion on CBG Construction for CBG-based (re) Transmission", 3GPP Draft, R1-1710830 Discussion on CBG Construction for CBG-Based (RE) Transmission Final, 3rd Generation Partnership Project (3GPP), Mobile Competence Centre, 650, Route Des Lucioles, F-06921 SOPH vol. RAN WG1, No. Qingdao, P.R. China, Jun. 27, 2017-Jun. 30, 2017, Jun. 17, 2017 (Jun. 17, 2017), XP051305248, 6 Pages, Retrieved from the Internet: URL:http://www.3gpp.org/ftp/tsg_ran/WG1_RL1/TSGR1_AH/NR_AH_1706/Docs/[retrieved on—Jun. 17, 2017].
ZTE: "DCI Considerations for CBG Transmission from two TBs", 3GPP Draft, R1-1708217 DCI Consideration for CGB Transmissions from TWO TBS, 3rd Generation Partnership Project (3GPP), Mobile Competence Centre, 650, Route Des Lucioles, F-06921 Sophia-Antipolis CE, vol. RAN WG1, No. Hangzhou, May 15, 2017-May 19, 2017, May 14, 2017 (May 14, 2017), XP051273412, pp. 1-5, Retrieved from the Internet: URL:http://www.3gpp.org/ftp/Meetings_3GPP_SYNC/RAN1/Docs/ [retrieved on May 14, 2017].
Taiwan Search Report—TW107124238—TIPO—dated Aug. 31, 2021.
CATT: "Discussion on NR HARQ-ACK Feedback Mechanisms", 3GPP TSG RAN WG1 Meeting #88bis, R1-1704583, 3rd Generation Partnership Project (3GPP), Mobile Competence Centre, 650, Route Des Lucioles, F-06921 Sophia-Antipolis Cedex, France, vol. RAN WG1. No. Spokane, USA, Apr. 3, 2017-Apr. 7, 2017, Apr. 2, 2017 (Apr. 2, 2017), XP051242722, 4 Pages, Retrieved from the Internet: URL: http://www.3gpp.org/ftp/Meetings_3GPP_SYNC/RAN1/Docs/, [retrieved on Apr. 2, 2017], p. 1, Paragraph 2, p. 3, Paragraph 3, p. 4, Paragraph 4.

\* cited by examiner

Retransmitting the subset of the code block groups on at least one of the first code word or the second code word in a retransmission in the HARQ process, wherein at least one code block is retransmitted on a different code word in the retransmission than in the original transmission

902

Calculating a nominal payload size of the subset of the code block groups

904

Allocating the subset of code block groups to the first code word and the second code word proportionately according to the nominal payload size

906

Allocating code blocks within the subset of code block groups to the first code word and the second code word proportionately according to a control block payload size

908

Rate matching to fill the code blocks of the fist code word and the second code word with the at least one code block group

*FIG. 9*

SYSTEMS AND METHODS FOR HARQ TRANSMISSION AND RETRANSMISSION USING MULTIPLE CODE WORDS

CLAIM OF PRIORITY UNDER 35 U.S.C. § 119

This application claims priority to U.S. Provisional Application No. 62/547,456, titled "SYSTEMS AND METHODS FOR HARQ TRANSMISSION AND RETRANSMISSION USING MULTIPLE CODE WORDS," filed Aug. 18, 2017, which is assigned to the assignee hereof, and incorporated herein by reference in its entirety.

BACKGROUND

Aspects of the present disclosure relate generally to wireless communication networks, and more particularly, to physical layer transmissions using multiple code words.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current multiple code word retransmission solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including transmitting an original transmission in a hybrid automatic repeat request (HARQ) process. The original transmission has a first transport block allocated to a first code word and a second transport block allocated to a second code word. Each transport block includes multiple code blocks grouped into code block groups. The method includes receiving a negative acknowledgement indicating that a subset of the code block groups were not successfully received. The method includes retransmitting the subset of the code block groups on at least one of the first code word or the second code word in a retransmission in the HARQ process. At least one code block is retransmitted on a different code word in the retransmission than in the original transmission.

In another aspect, the present disclosure provides an apparatus for wireless communication. The apparatus may include a memory, a transceiver, and a processor communicatively coupled with the memory and the transceiver. The processor may be configured to transmit an original transmission in a HARQ process. The original transmission may have a first transport block allocated to a first code word and a second transport block allocated to a second code word, each transport block including multiple code blocks grouped into code block groups. The processor may be configured to receive a negative acknowledgment indicating that a subset of the code block groups was not successfully received. The processor may be configured to retransmit the subset of the code block groups on at least one of the first code word or the second code word in a retransmission in the HARQ process, wherein at least one code block is retransmitted on a different code word in the retransmission than in the original transmission.

In another aspect, the disclosure provides another apparatus for wireless communication. The apparatus may include means for transmitting an original transmission in a HARQ process, the original transmission having a first transport block allocated to a first code word and a second transport block allocated to a second code word, each transport block including multiple code blocks grouped into code block groups. The apparatus may include means for receiving a negative acknowledgment indicating that a subset of the code block groups was not successfully received. The apparatus may include means for retransmitting the subset of the code block groups on at least one of the first code word or the second code word in a retransmission in the HARQ process, wherein at least one code block is retransmitted on a different code word in the retransmission than in the original transmission.

In another aspect, the disclosure provides a computer-readable medium storing computer code executable by a processor for wireless communications. The computer-readable medium may include code to transmit an original transmission in a HARQ process, the original transmission having a first transport block allocated to a first code word and a second transport block allocated to a second code word, each transport block including multiple code blocks grouped into code block groups. The computer-readable medium may include code to receive a negative acknowledgment indicating that a subset of the code block groups was not successfully received. The computer-readable medium may include code to retransmit the subset of the code block groups on at least one of the first code word or the second code word in a retransmission in the HARQ process, wherein at least one code block is retransmitted on a different code word in the retransmission than in the original transmission To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is an example HARQ process that maintains original code word allocation.

FIG. 3 is an example HARQ process that proportionately balances code block groups across code words.

FIG. 5 is an example HARQ process using a single code word to retransmit transport blocks from two code words.

FIG. 6 is an example HARQ process using two code words to retransmit a transport block from a single code word.

FIG. 9 is a flow diagram of an example of a method of retransmitting a subset of code block groups.

DETAILED DESCRIPTION

Figure 1:
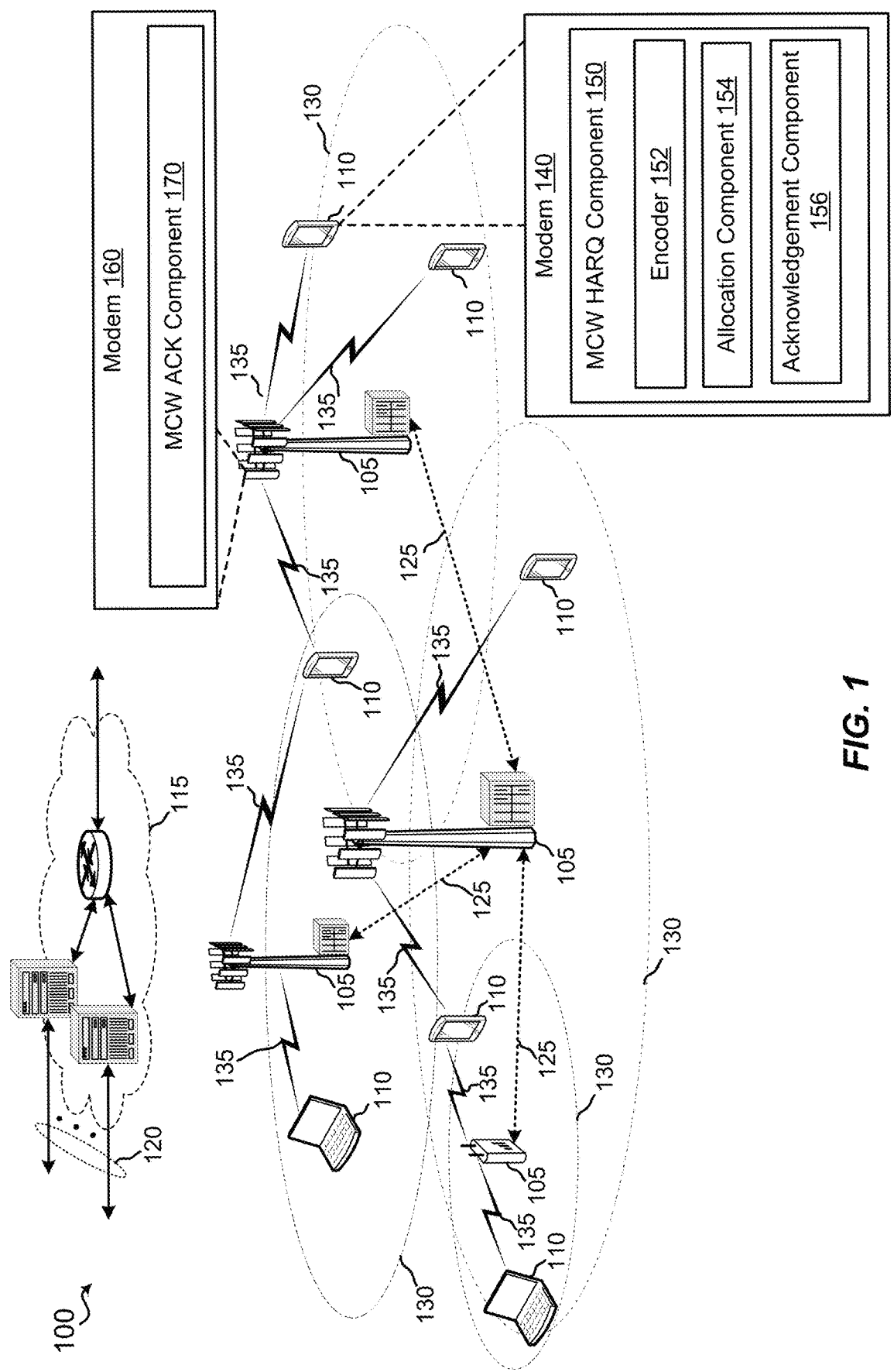
FIG. 1 is a schematic diagram of a wireless communication network including at least one user equipment (UE) or base station having a multiple code word (MCW) hybrid repeat request (HARQ) component configured according to this disclosure to retransmit a transmission using multiple code words.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to transmissions using multiple code words (MCW). In wireless transmissions using multiple antennas, increased transmission rates may be achieved using spatial multiplexing via different antennas or different groups of antennas (i.e., virtual antennas). Each virtual antenna may be associated with a code word (CW). In LTE systems, each code word may be assigned a transport block (TB). For hybrid automatic repeat request (HARQ) using multiple code words (MCW), if one of the transport blocks on a first CW is not received correctly, the transport block may be retransmitted on the first CW, while a second transport block that was successfully received on a second CW may be replaced by new data. In LTE MCW transmission, when between the two TBs, one decodes and the other fails, LTE supports mixing the retransmission of the failed TB and the initial transmission of another TB. LTE also supports the retransmission of the failed TB only in SCW fashion.

In a 5G NR system, a TB may include multiple code block groups (CBG), which in turn may include multiple code blocks (CB). For a HARQ process, some of the CBG may be received successfully, while other CBG are not received successfully. A bitmap indicating the successfully received CBG may be provided by the ACK/NACK. Accordingly, CBG level retransmission may be supported. That is, a retransmission for a HARQ process may include only those CBG that were not successfully received. In a MCW transmission, the unsuccessfully received CBG to be retransmitted may be unevenly divided among the TBs or CWs. Accordingly, a retransmission maintaining the CBGs on the original TBs and CWs may be less efficient. For example, the CW carrying the larger payload may be more likely to experience errors than the CW carrying the smaller payload.

In an aspect, the present disclosure provides for HARQ retransmissions of MCW transmissions where CW are decoupled from the original TB of the transmission. Accordingly, a CBG or a CB may change CW for the retransmission. Therefore, the retransmission may be balanced with a proportionate payload size for each CW to improve performance. Additional features of the present aspects are described in more detail below with respect to FIGS. 1-11

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a MCW HARQ component 150 that transmits a retransmission for a HARQ process using multiple code words. The MCW HARQ component 150 may include an encoder 152 for encoding data into code blocks grouped into code block groups, an allocation component 154 for allocating code blocks and/or code block groups among multiple code words, and an acknowledgment component 156 for receiving an acknowledgment (ACK) or negative acknowledgement (NACK) from a receiving device, e.g., a base station 105. Further, wireless communication network 100 includes at least one base station 105 with a modem 160 having a MCW ACK component 170 that receives multiple code word transmissions and provides code block group level acknowledgements (ACK/NACK). Thus, according to the present disclosure, the UE 110 may transmit an original transmission including code block groups using a HARQ process, receive a negative acknowledgement identifying at least some code block groups that were not correctly received, and retransmit the code block groups using multiple code words in a proportionately balanced retransmission. In an aspect, the MCW HARQ component 150 may be located in the base station 105 and the MCW ACK component 170 may be located in the UE 110. The base station 105 may use the MCW HARQ component 150 transmit an original transmission including code block groups using a HARQ process, receive a negative acknowledgement identifying at least some code block groups that were not correctly received, and retransmit the code block groups using multiple code words in a proportionately balanced retransmission.

The encoder 152 may generate transport blocks including the multiple code blocks grouped into code block groups. The encoder 152 may generate the code blocks based on data to be transmitted such that the code blocks each have specified size, for example, based on a modulation and coding scheme (MCS). The encoder 152 may use a different MCS for each code word. When one or more code blocks or code block groups are determined to not be received correctly, the encoder 152 may determine a payload size of the code blocks or code block groups.

The allocation component 154 may allocate may allocate code blocks or code block groups among code words according to one or more rules. In scenarios where a HARQ retransmission includes no new transport block, the allocation component 154 may allocate code blocks or code block groups among the code words in a balanced manner. For example, the allocation component 154 may attempt to allocate the code blocks or code block groups for the retransmission proportionally with the payload of the original transmission. In a scenario where the HARQ retransmission includes a new transport block, the allocation component 154 may allocate retransmitted code blocks or code block groups to a code word for retransmission and allocate new code blocks or code block groups to a code word for a new transport block.

The acknowledgment component 156 may receive an acknowledgment or negative acknowledgment from a base station 105 and determine whether to retransmit one or more code blocks or code block groups on one or more code words. The acknowledgment component 156 may interpret a negative acknowledgment to determine which code blocks or code block groups were not successfully received. The acknowledgment component 156 may also track new data indicators (NDI) included in downlink control information (DCI) to determine whether code blocks or code block groups that were not received correctly have been abandoned. For example, the base station 105 may determine that a code block has been abandoned when no acknowledgment is received for the code block, but a NDI for the corresponding code word indicates new data (e.g., has been flipped).

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use HARQ to provide retransmission at the MAC layer to improve link efficiency. For example, the MCW HARQ component 150 may operate at the MAC layer. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
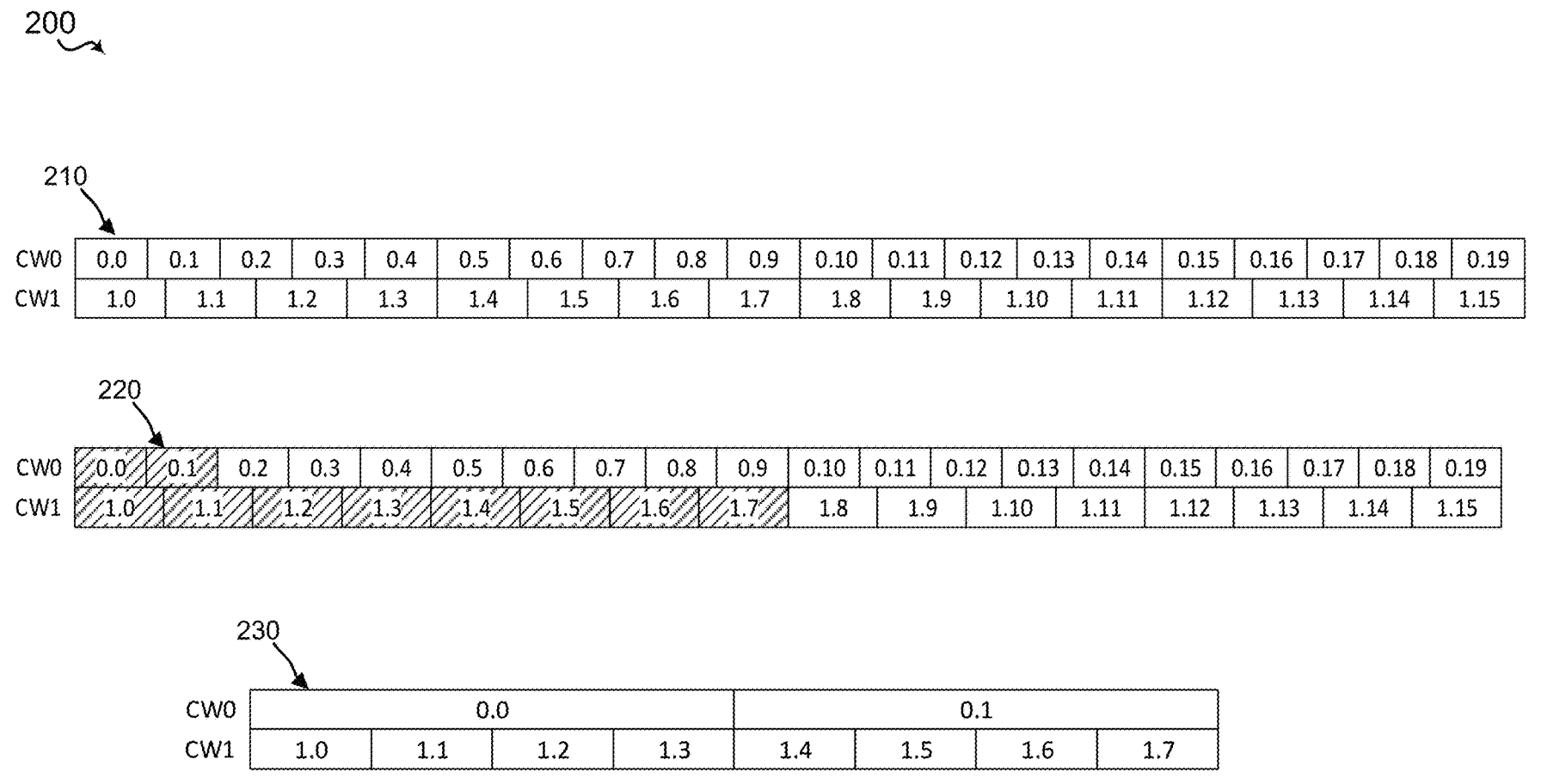

Referring to FIG. 2, an example HARQ process 200 includes a transmission 210 by a transmitting device (e.g., the UE 110 or the base station 105), an acknowledgment 220 by a receiving device (e.g., the base station 105 or the UE 110) with respect to the transmission 210, and a retransmission 230 by the transmitting device (e.g., the UE 110 or the base station 105) of information in the transmission 210 that was not received by the receiving device. The retransmission 230 may maintain original transport block and code word allocations of code block groups from the transmission 210. The example HARQ process 200 may illustrate a baseline design extending LTE principles to NR. The transmission 210 and the retransmission 230 may use MCW. MCW may allow transmission of two transport blocks (TB) on the same HARQ process. In an aspect, MCW may be selected based on the rank of the transmission. The rank may refer to a number of uncorrelated antennas. For example, if the rank is greater than 4, MCW transmission may be selected. If the rank is less than or equal to 4, a single code word transmission may be selected. In some aspects, a rank threshold other than 4 may be used. In the illustrated example, the transmission 210 uses MCW with a first TB on the first code word (CW0) including 20 CBG (0.0-0.19) and a second TB on the second code word (CW1) including 16 CBG (1.0-1.15). The number of CBG in each code word may depend on resources granted for the transmission (e.g., a number of resource elements or resource element groups) and a modulation and coding scheme (MCS) assigned to the transmission.

The HARQ process 200 may include the acknowledgement (ACK) 220. In the illustrated example, the ACK 220 may indicate that at least one CBG of the transmission 210 was not received correctly (e.g., illustrated by cross-hatching). Accordingly, the ACK 220 may be considered, at least in part, a negative acknowledgment (NACK). The ACK 220 may indicate ACK/NACK status on a CBG level. For example, the ACK 220 may indicate that CBGs 0.0 and 0.1 on CW0 were not received correctly and CBGs 1.0-1.7 on CW 1 were not received correctly. In this case, the indication of a CBG "not being received correctly" may include an indication of a failure by the receiving device to properly decode a cyclic redundancy check (CRC) contained in the transmission 210, and thus may include or imply a request for retransmission.

The retransmission 230 may retransmit the CBGs of the original TBs on the original CWs. In the illustrated example, CW0 may include 2 CBGs (0.0 and 0.1) while CW1 may include 8 CBGs (1.0-1.7). Accordingly, the payload sizes of the two CW are different. Moreover, the payload sizes are not proportionate. Whereas CW0 originally carried 20 CBG in the transmission 210, CW0 carries only 2 CBG in the retransmission 230. Additionally, CW1 originally carried 16 CBG in the transmission 210 and carries 8 CBG in the retransmission 230. Accordingly CW1 carries a much higher proportion of the CBG in the retransmission. The illustrated retransmission may be considered an inefficient use of the resources of CW0. Moreover, CW0 cannot be scaled down by assigning fewer frequency and time domain resources because CW0 and CW1 share the same frequency and time domain resources.

Figure 3:
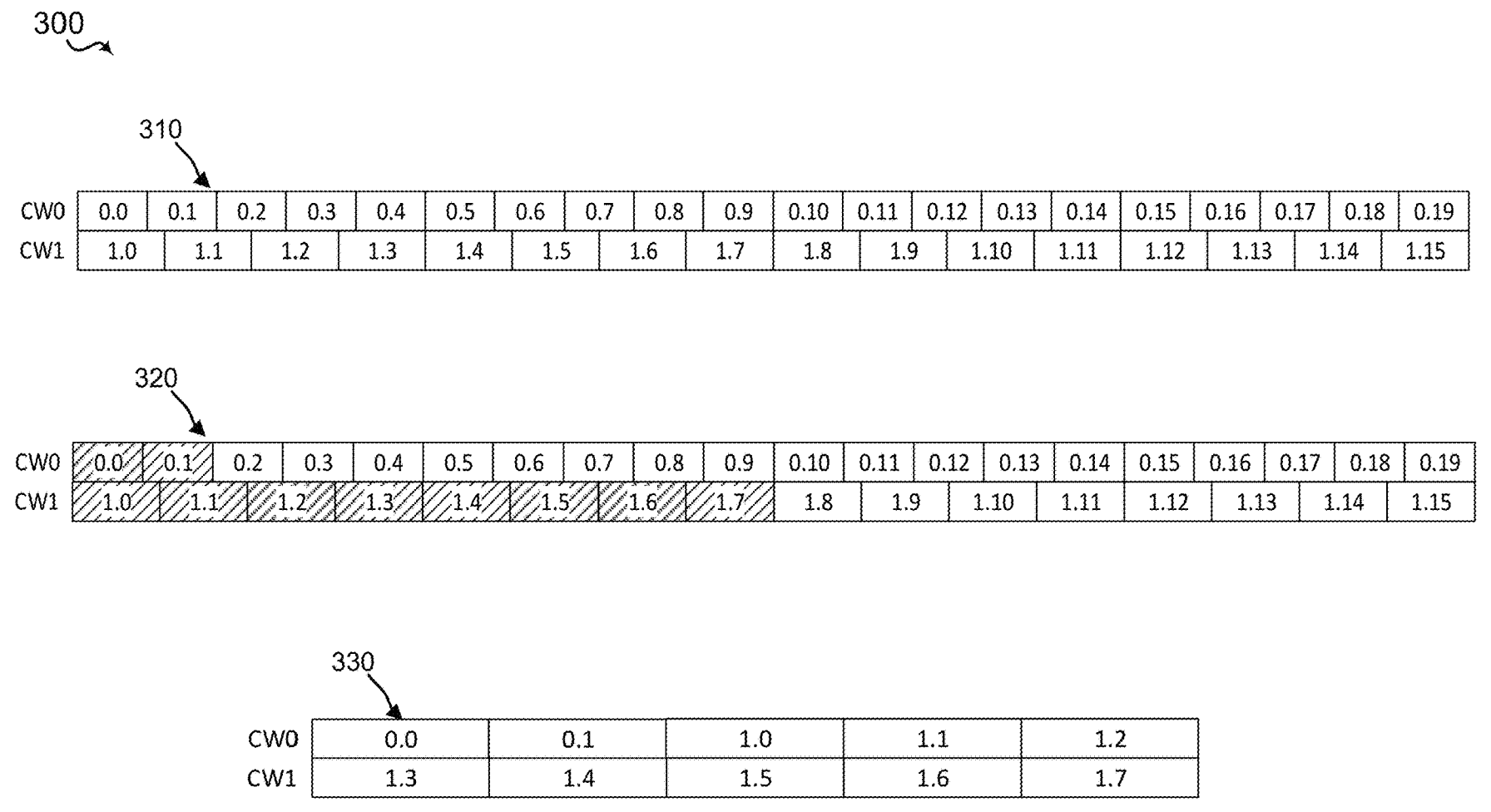

Referring to FIG. 3, a HARQ process 300 includes transmission 310 by a transmitting device, an ACK 320 by a receiving device, and a retransmission 330 by the transmitting device that proportionately balances CBGs among the CWs. The retransmission 330 may include a CBG that was initially transmitted on a first CW and is retransmitted on a second CW. The HARQ process 300 may illustrate a scenario where there is no new TB transmission. This scenario may cover a case where both TBs fail (e.g., at least one CBG in each TB is not correctly received) and a case where only one TB fails but no new TB replaces the successful TB. A second scenario where one TB is received correctly and one TB is not correctly received, but a third TB replaces the correctly received TB is discussed further below with respect to FIG. 7.

The transmission 310 and the ACK 320 may be similar to the transmission 210 and the ACK 220. Conceptually, the CWs may be treated as containers and the TBs may be viewed as content to be placed in the containers. The CW and the TB may be logically separated. In an original transmission, the CW and TB concepts may align such that each TB is transmitted in a respective CW. In a retransmission, however, CBs or CBGs of a TB may be allocated to the available CWs proportionately according to payload size.

The MCW HARQ component 150 may be given an assignment (MCS, RB allocation, rank of the two CWs) for the retransmission, and may calculate a nominal payload size. The payload size may be calculated by look up using the same transport block size (TBS) table as an initial transmission or following the same TBS calculation. In a first example design, given the list of CBGs included in the retransmission, the payload size of each CBG is known (e.g., determined in the initial transmission). The allocation component 154 may allocate the CBGs to the two CWs proportionally according to the CBG payload size. The allocation component 154 may enforce a rule that a single CBG may not cross code words (e.g., one or more CBs transmitted on each CW). For example, as illustrated in FIG. 3, the retransmission 330 may include CBGs 0.0, 0.1, and 1.0-1.2 on CW0 and CBGs 1.3-1.7 on CW1. Accordingly at least one code block (e.g., CBGs 1.0, 1.1, 1.2) is retransmitted on a different code word (CW0) in the retransmission 330 than in the original transmission 310 (CW1). Moreover, as illustrated, the retransmission 330 is balanced because each CW includes 5 CBGs. Rate matching may be used to fill coded bits of the allocated CBGs into the respective CWs (e.g., according to MCS). For example, coded bits from the code blocks assigned into the first code word and the second code word may be rate matched into available resource elements.

The allocation component 154 may proportionally allocate the CBs or CBGs based on payload size. From the retransmission downlink control information (DCI), the payload sizes for each CW may be calculated as P0 and P1, respectively. P1 may be 0 if there is only one CW in the retransmission. The allocation component 154 may compute ratio of a payload for each CW to a total payload. For example, a first ratio (R0) may be calculated by R0=P0/(P0+P1) and a second ratio (R1) may be calculated by R1=P1/(P0+P1). The allocation component 154 may sequentially list all CBs or CBGs (a number N of not correctly received CBs or CBGs indicated by the ACK 320) for the payload size (known from the initial transmission). For example, the CBs or CBGs may be listed as $X(0), X(1), \ldots, X(N-1)$. In the illustrated example of FIG. 3, N may be 10 and X may represent a payload size of the respective CBGs. In the case where allocation component 154 allocates CBs, N may be the number of CBGs times the number of CBs per CBG, or the total number of CBs in the indicated CBGs. The allocation component 154 may segment the CBs or CBGs into two sets with N0 and N1 such that $N0+N1=N$; $X(0)+X(1)+ \ldots +X(N0-1) \approx R0*(P0+P1)$; and $X(N0)+X(N0+1)+ \ldots +X(N-1) \approx R1*(P0+P1)$. In other words, the set N0 may include a subset of the CBs or CBGs having a payload size approximately equal to the first ratio times the total payload (first proportionate size) and the set N1 may include a second mutually exclusive subset of the of the CBs or CBGs having a payload size approximately equal to the second ratio times the total payload (second proportionate size). Some rounding needed because the CB or CBG sizes may be discrete. Approximately equal may refer to the payload size for the subset being the closest to the proportionate size (e.g., adding another CB or CBG would result in a greater difference from the proportionate size). The allocation component 154 may allocate the first number of CBs or CBGs (N0) to CW0 and the remaining CBs or CBGs (N1) to CW1.

In an alternative aspect, the DCI may include a field indicating a location of the split (e.g., a start from which CBG switch to CW1). The field may have a length of ceil(log 2(# of CBGs)).

The DCI for an MCW transmission or retransmission may have information for two TBs (MCS, new data indicator (NDI), redundancy version identifier (RVID)) similar to LTE. The DCI information may be re-interpreted/re-defined to separate TB and CW. As discussed above, conceptually the TB may be viewed as content and the CW may be viewed as a container. The MCS may be a CW level concept that indicates the modulation order for the transmission of the CW. The MCS also can be used to determine the nominal payload size of the CW. Accordingly, the DCI may indicate MCS on a per CW basis. The NDI is a TB level concept. The NDI should not flip (change values) in the scenario where new TBs are not mixed with retransmissions. RVID is a TB level concept. The CBG/CB is associated with a TB in the initial transmission. The CB/CBGs in one TB is in one CW in the initial transmission, but may not be in the later transmissions anymore. The RVID may be set to not change during a HARQ process. In an aspect, unlike in LTE, a base station may not disable a CW using a defined MCS/RVID combination. Instead, the CBG indicator in the DCI may be used to disable a CW by indicating which CBGs are included in the transmission, i.e., transmissions may be disabled at the CBG level, not at CW level, if there is an explicit field indicating a location of the split (e.g., a CBG bitmap in DCI).

Figure 4:
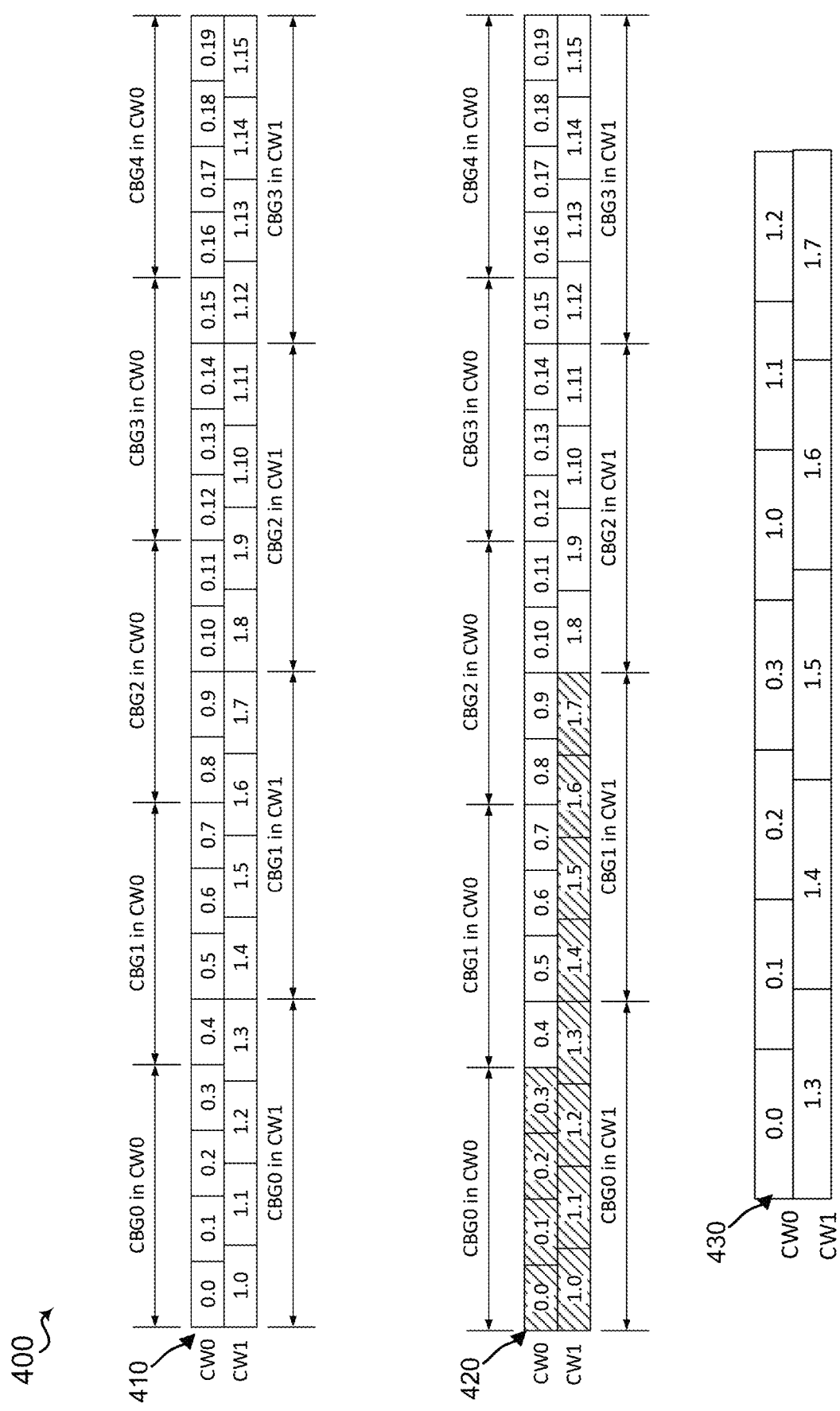
FIG. 4 is an example HARQ process that proportionately balances code blocks across code words.

Referring to FIG. 4, an example HARQ process 400 includes a transmission 410 by a transmitting device, an ACK 420 by a receiving device, and a retransmission 430 by the transmitting device using proportionally balanced code blocks. The original transmission 410 may include code blocks grouped into code block groups. For example, each CBG may include 4 CBs. CW0 may include 5 CBGs and CW1 may include 4 CBGs. The ACK 420 may indicate reception status at a CBG level. For example, as illustrated CBG0 on CW0, CBG0 in CW1, and CBG1 in CW1 may not have been correctly received. Rather than allocating CBGs among the CWs, the CBs may be allocated to the CWs. For example, the retransmission 430 may include CBs 0.0-0.3, and 1.0-1.2 in CW0 and CBs 1.3-1.7 in CW1. The allocation of CBs may provide finer degree of balancing. For example, the first payload ratio, R0, for the original transmission 410 may be approximately 0.55 and the second payload ratio, R1, for the original transmission 410 may be approximately 0.45. Accordingly, the number of CBs on CW0 may be approximately 0.55 times 12, which rounds to 7. The number of CBs on CW1 may be approximately 0.45 times 12, which rounds to 5. Therefore, although more CBs may be transmitted on CW0, the CWs may be proportionately balanced because, for example, CW0 may have a higher MCS.

The above design is flexible enough to be generalized to support dynamic rank adaptation and adaptation between SCW and MCW. The above design however, may not support mixed transmission of one new TB and one retransmission TB. For example, the case of the retransmission TB being a CBG level retransmission (partial TB retransmission) with a new TB may not be supported. Because the number of CWs solely depends on the rank, more information needs to be included in DCI to support mixing of new TBs and retransmissions. In an aspect, only one NDI may be needed to indicate a new TB instead of one NDI per TB.

Figure 5:
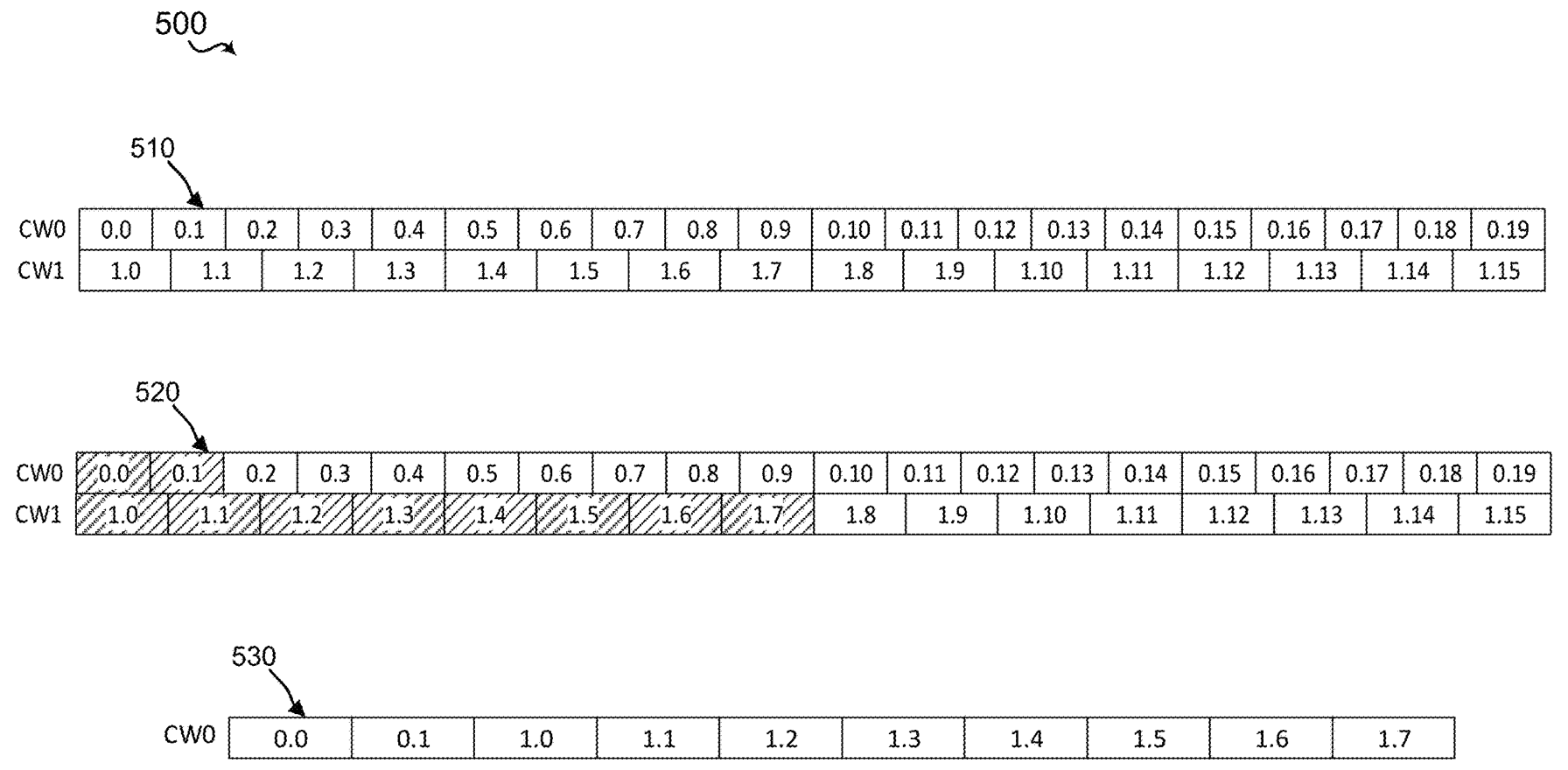

Referring to FIG. 5, a HARQ process 500 may include a transmission 510 by a transmitting device, an ACK 520 by a receiving device, and a retransmission 530 by the transmitting device. The HARQ process 500 may use a single CW for the retransmission 530. The transmission 510 and the ACK 520 may be similar to the transmission 210 and the ACK 220. In this example, the rank may change between the transmission 510 and the retransmission 530 such that SCW is selected. In another example, the base station may disable the second CW by indicating that all CBGs should be retransmitted in CW0. In either case, the retransmission 530 may include all of the incorrectly received CBGs (0.0, 0.1, and 1.0-1.7). The CBGs 1.0-1.7 may change from CW1 from the original transmission 510 to CW0 for the retransmission 530.

Figure 6:
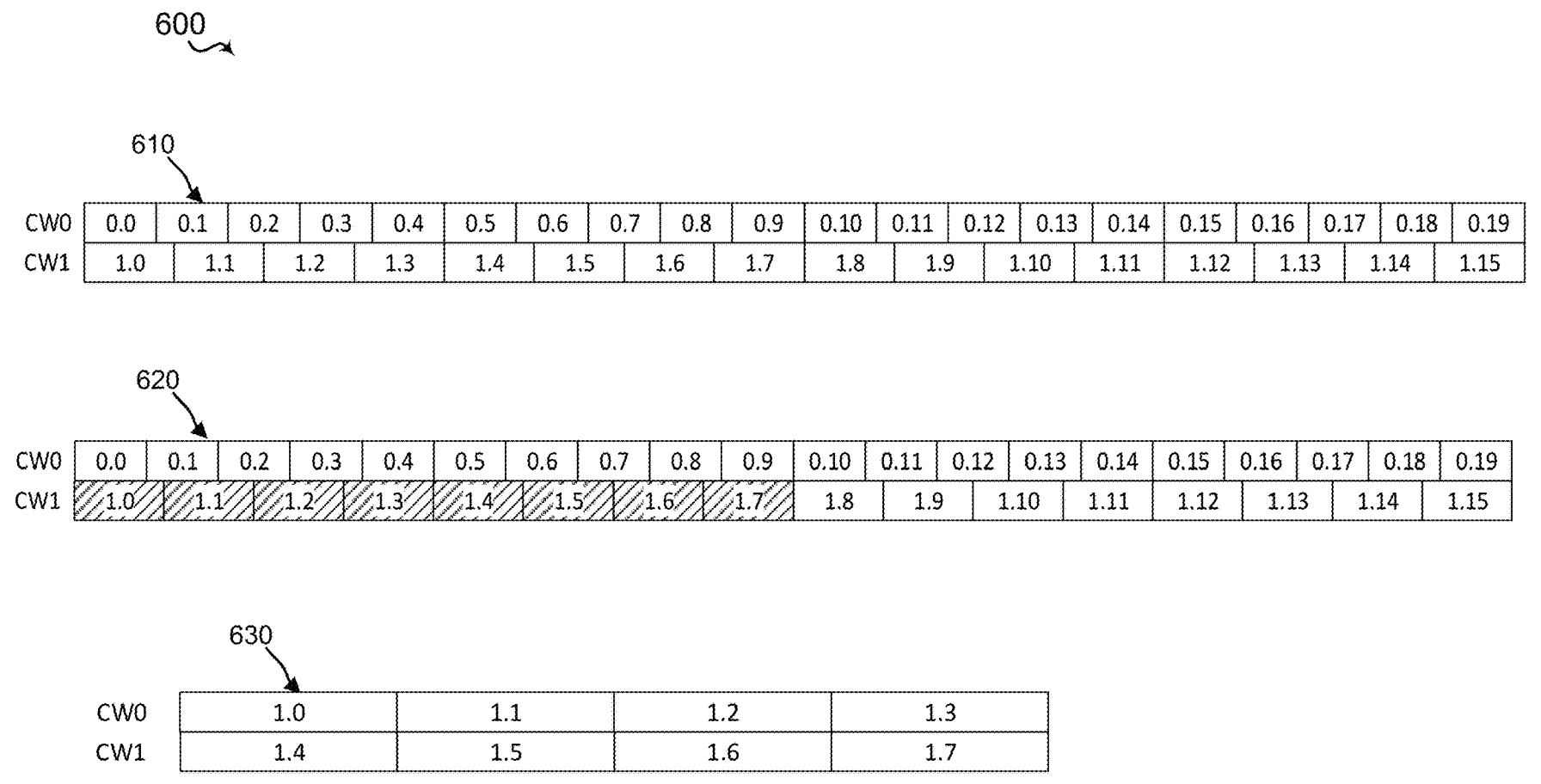

Referring to FIG. 6, a HARQ process 600 may include a transmission 610 by a transmitting device, an ACK 620 by a receiving device, and a retransmission 630 by the transmitting device. The HARQ process 600 may retransmit CBGs from one of the CWs using two CWs. The transmission 610 may be similar to the transmission 210. The ACK 620 may indicate that all of the CBG on CW0 (0.0-0.19) were correctly received, but CBGs 1.0-1.7 on CW1 were not correctly received. The retransmission 630 may use two CWs based on the rank, which may remain unchanged, so MCW may be selected for the retransmission 630. The retransmission 630 may include all of the incorrectly received CBGs (1.0-1.7) split between the CWs. The CBGs 1.0-1.3 may change from CW1 from the original transmission 610 to CW0 for the retransmission 630 while the CBGs 1.4-1.7 may be retransmitted on CW1.

Figure 7:
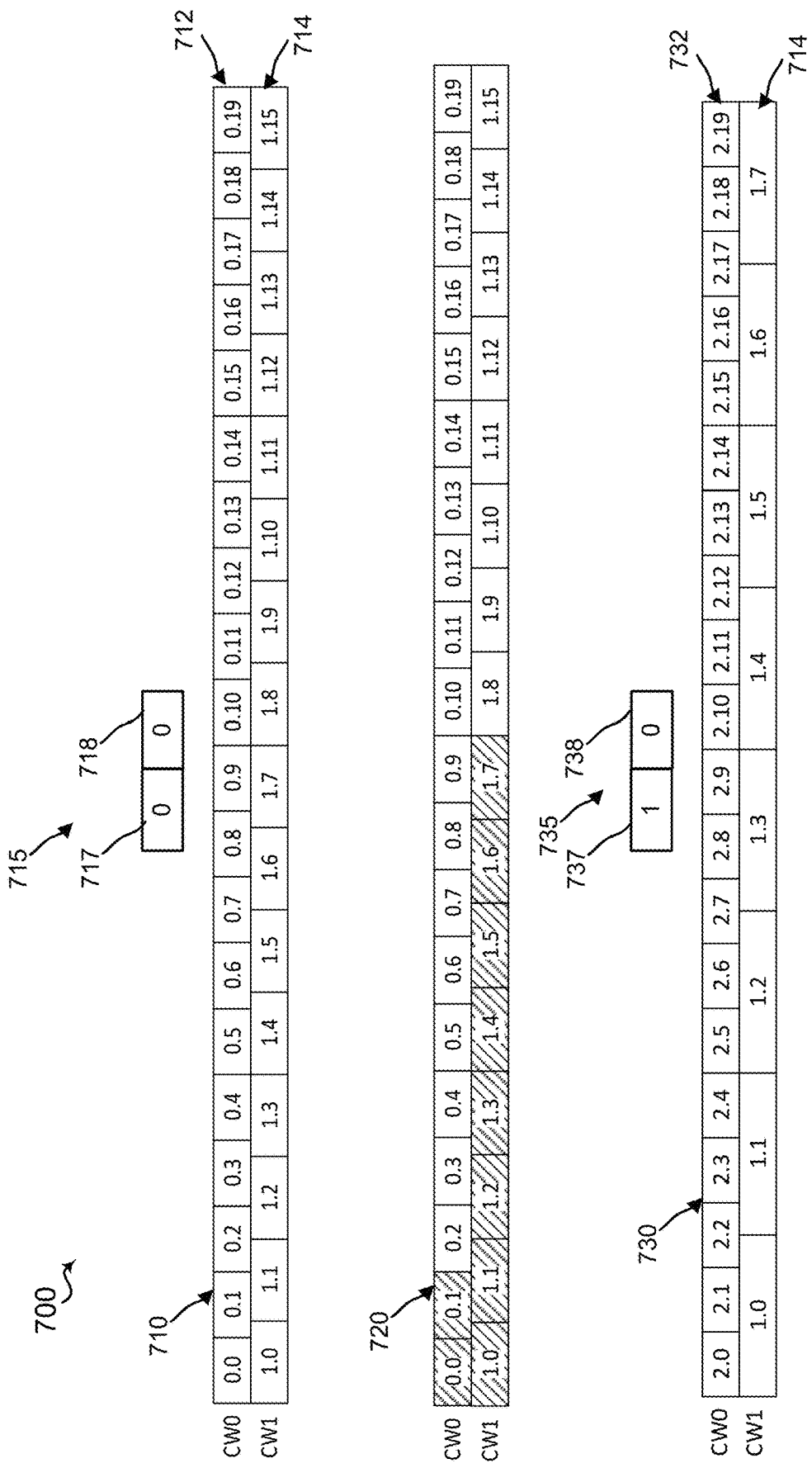
FIG. 7 is an example HARQ process using new data indicators (NDI) to retransmit one transport block and also transmit a new transport block.

Referring to FIG. 7, a HARQ process 700 may mix a new TB with a retransmission. That is, the MCW HARQ component 150 may start a new TB and retransmit some CBGs from another TB. The HARQ process 700 may include a transmission 710 by a transmitting device, an ACK 720 by a receiving device, and a retransmission 730 by the transmitting device. The transmission 710 may be based on a DCI 715 and include a first TB 712 and a second TB 714. The retransmission 730 may be based on a DCI 735 and include a first TB 732 and a second TB 734. In this design, it is more important that the CBGs do not cross TB boundary. The DCI 715 may include two NDIs 717, 718. The base station may flip one or both of the NDI 717, 718 to indicate that a new TB starts. For example, as illustrated, the NDI 717 may be flipped from a value of 0 to a value of 1 in the NDI 737. When any NDI flips (one of the NDI flips or both NDIs flip), the MCW HARQ component 150 may enforce the rule that the CBGs from each CW do not cross boundary. In other words, when both NDIs are not flipped, the MCW HARQ component 150 may ignore the boundary. If an NDI is flipped but from CBG bitmap of the ACK 720, the CBGs from the corresponding TB did not finish transmission, the MCW HARQ component 150 may consider those CBGs abandoned. For example, as illustrated, CBGs 0.0 and 0.1 may be considered abandoned.

For robustness purposes, the new TB may use the same number of CBGs as the TB it replaces. For example, the first TB 732 may use 20 CBGs as did the first TB 712. It should be noted that the number of CBGs is not the total number of CBGs in transmission 710, but only the number of CBGs from the previous grouping in the first TB 712. Another option is to use the configured total number of CBGs in transmission 710 minus the remaining number of CBGs in the second TB 734. This option allows more CBGs in the new TB. For example, a total of 36 CBGs minus the 8 retransmitted CBGs would allow 28 CBGs to be allocated among the first TB 732 and the second TB 734.

As illustrated in FIG. 7, the transmission 710 may include a total of 36 CBGs divided as 20 CBGs (0.0-0.19) in TB 712 on CW0 and 16 CBGs (1.0-1.15) in TB 714 on CW1. The transmission 710 may be based on the DCI 715 including the first NDI 716 and the second NDI 718, which may each have a value of 0. The ACK 720 may indicate that CBGs 0.0 and 0.1 on CW0 were not received correctly and CBGs 1.0-1.7 on CW 1 were not received correctly. The MCW HARQ component 150 may also receive the DCI 735 including the first NDI 736 having a value of 1 and the second NDI 738 having a value of 0. Accordingly the first NDI 717, 737 may be flipped while the second NDI 718, 738 is not flipped. The MCW HARQ component 150 may determine to retransmit incorrectly received CBGs of the TB 714 and transmit a new TB on CW0, which corresponds to the flipped first NDI 736. The retransmission 730 may include a new TB 732 on CW0 and a partial retransmission of TB 714 on CW1. As noted above, CBGs 0.0 and 0.1 from TB 712 may be considered abandoned.

Figure 8:
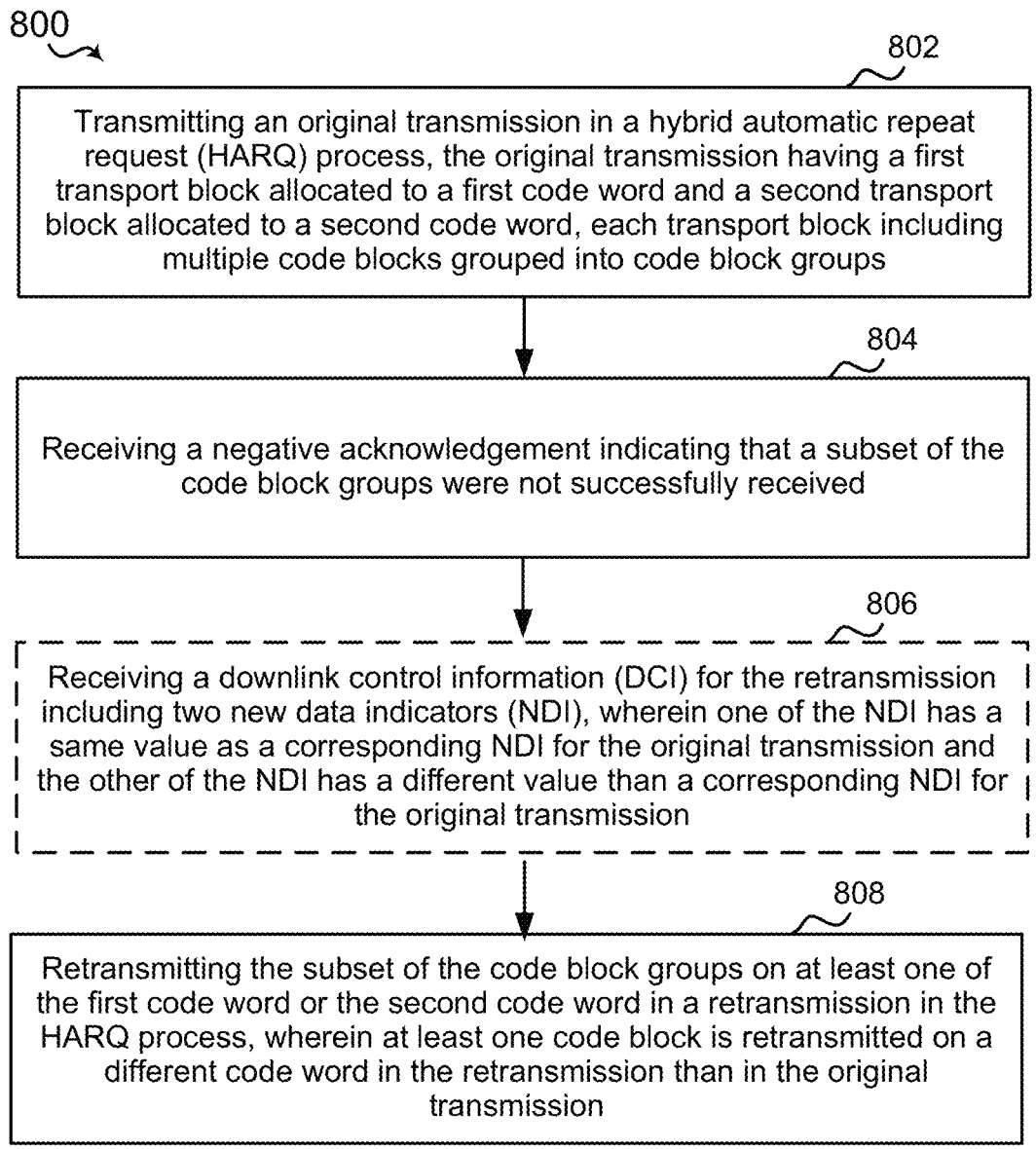
FIG. 8 is a flow diagram of an example of a method of retransmitting a transmission in a HARQ process using multiple code words.

Referring to FIG. 8, for example, a method 800 of wireless communication in operating UE 110 according to the above-described aspects to perform a MCW transmission includes one or more of the herein-defined actions.

For example, at 802, the method 800 includes transmitting an original transmission in a hybrid automatic repeat request (HARQ) process, the original transmission having a first transport block allocated to a first code word and a second transport block allocated to a second code word, each transport block including multiple code blocks grouped into code block groups. For instance, in an aspect, UE 110 may execute MCW HARQ component 150 to transmit the original transmission in the HARQ process. The original transmission 310, 410, 510, 610, 710 may have a first transport block (e.g., TB 712) allocated to a first code word (e.g., CW0) and a second transport block (e.g., TB 714) allocated to a second code word (e.g., CW1), each transport block including multiple code blocks grouped into code block groups, as described herein. More specifically, the MCW HARQ component 150 may execute the encoder 152 to generate the transport blocks including the multiple code blocks grouped into code block groups. The allocation component 154 may allocate the code block groups to the first code word and the second code word. The MCW HARQ component 150 of modem 140 may communicate with transceiver 1002 (e.g., transmitter 1008) and RF front end 1088 and antennas 1065 to take the encoded transport blocks and transmit a wireless signal.

At 804, the method 800 may include receiving a negative acknowledgement indicating that a subset of the code block groups were not successfully received. In an aspect, for example, the UE 110 may execute MCW HARQ component 150 to receive the negative acknowledgement indicating that a subset of the code block groups were not successfully received. More specifically, the MCW HARQ component 150 may execute the acknowledgment component 156 to receive the negative acknowledgment 320, 420, 520, 620, 720 indicating that a subset of the code block groups were not successfully received. For example, the MCW HARQ component 150 of modem 140 may communicate with the transceiver 1002 (e.g., receiver 1006), RF front end 1088, and antennas 1065 to convert a radio-frequency signal received at antennas 1065 to a baseband signal and decode the baseband signal to determine whether the signal includes a negative acknowledgment. The acknowledgment component 156 may interpret the negative acknowledgment 320, 420, 520, 620, 720 to determine which code block groups should be included in the retransmission based on a retransmission grant.

At 806, the method 800 may optionally include receiving downlink control information (DCI) for the retransmission including two new data indicators (NDI). For instance, the UE 110 may execute the MCW HARQ component 150 to receive the DCI 735 including NDIs 737, 738 for the retransmission 730. For example, the MCW HARQ component 150 of modem 140 may communicate with the transceiver 1002 (e.g., receiver 1006), RF front end 1088, and antennas 1065 to convert a radio-frequency signal received at antennas 1065 to a baseband signal and decode the baseband signal to identify the DCI 735 including NDIs 737, 738. The MCW HARQ component 150 may check if the NDIs flip. If neither of them flip, the MCW HARQ component 150 may retransmit one or both TBs in the transmission 710 without mixing a new transmission in the HARQ process. The MCW HARQ component 150 may allow CBGs/CBs from one TB to be placed in the other CW. If one of the NDIs flip, or both flip, the MCW HARQ component 150 may enforce a rule that the TB stays within CW. For example, where one of the NDI 737, 738 has a same value as a corresponding NDI 717, 718 for the original transmission and the other of the NDI has a different value than a corresponding NDI for the original transmission, a new TB may be transmitted. If both NDIs flip, the CBG grouping may start afresh given the configured CBG number.

At 808, the method 800 may include retransmitting the subset of the code block groups on at least one of the first code word and the second code word in a retransmission in the HARQ process. At least one code block is retransmitted on a different code word in the retransmission than in the original transmission. For instance, the UE 110 may execute the MCW HARQ component 150 to retransmit the subset of the code block groups on at least one of the first code word and the second code word in the retransmission in the HARQ process. More specifically, the MCW HARQ component 150 may execute the allocation component 154 to allocate the subset of the code block groups to the first code word and/or the second code word such that at least one code block is retransmitted on a different code word in the retransmission 330, 430, 530, 630, 730 than in the original transmission 310, 410, 510, 610, 710. In an aspect, the allocation component 154 may allocate the subset of the code block groups proportionally among the code words. Proportionally allocating the code block groups or code blocks thereof may increase the probability that the code blocks in the retransmission 330, 430, 530, 630, 730 will be successfully received.

Referring to FIG. 9, for example, further details of the block 808 for operating UE 110 according to the above-described aspects retransmit a MCW transmission in a HARQ process include one or more of the herein-defined actions.

At 902, block 808 may include calculating a nominal payload size of the subset of the code block groups. In an aspect, for example, the MCW HARQ component 150 may execute the encoder 152 to calculate the nominal payload size of the subset of the code block groups according to the nominal payload size of the code block groups in the original transmission. The nominal payload size may be calculated based on the transport block size (TBS), which may be the same as the TBS for the original transmission (assuming no change in MCS) or recalculated based on the MCS. The TBS may be, for example, a number of bits per symbol (based on MCS) times a number of symbols per resource element, times a number of allocated resource elements, times a rank of the code word.

At 904, block 808 may optionally include allocating the subset of code block groups to the first code word and the second code word proportionately according to the nominal payload size. For example, the MCW HARQ component 150 may execute the allocation component 154 to allocate the subset of code block groups to the first code word and the second code word proportionately according to the nominal payload size as illustrated in FIG. 3. The allocation component 154 may allocate the code block groups proportionately by determining a ratio (e.g., the percentage of total bits carried on each code word) of the nominal payload size for each codeword to a total payload size. The allocation component 154 may then allocate the subset of code block groups to each codeword based on the ratio. For example, the allocation component 154 may multiply the number of code block groups times the ratio for each code word to determine the number of code block groups for the code word, rounding to a whole number of code block groups per code word. The allocation component 154 may then sequentially allocate the number of code block groups from the subset of code block groups to the code words.

At 906, block 808 may optionally include allocating code blocks within the subset of code block groups to the first code word and the second code word proportionately according to a control block payload size. For example, the MCW HARQ component 150 may execute the allocation component 154 to allocate code blocks within the subset of code block groups to the first code word and the second code word proportionately according to a control block payload size as illustrated in FIG. 4. Similar to block 904, the allocation component 154 may allocate the code blocks proportionately by determining a ratio (e.g., the percentage of total bits carried on each code word) of the nominal payload size for each codeword to a total payload size. The allocation component 154 may then allocate the code blocks in the subset of code block groups to each codeword based on the ratio. For example, the allocation component 154 may multiply the number of code blocks times the ratio for each code word to determine the number of code blocks for the code word, rounding to a whole number of code blocks per code word. The allocation component 154 may then sequentially allocate the number of code blocks from the code blocks in the subset of code block groups to the code words. A code block group may be split between two code words.

At 908, the block 808 may optionally include rate matching to fill the code blocks of the first code word or the second code word with the at least one code block group. For example, the MCW HARQ component 150 may perform rate matching to fill the code blocks of the first code word or the second code word with the at least one code block group.

Figure 10:
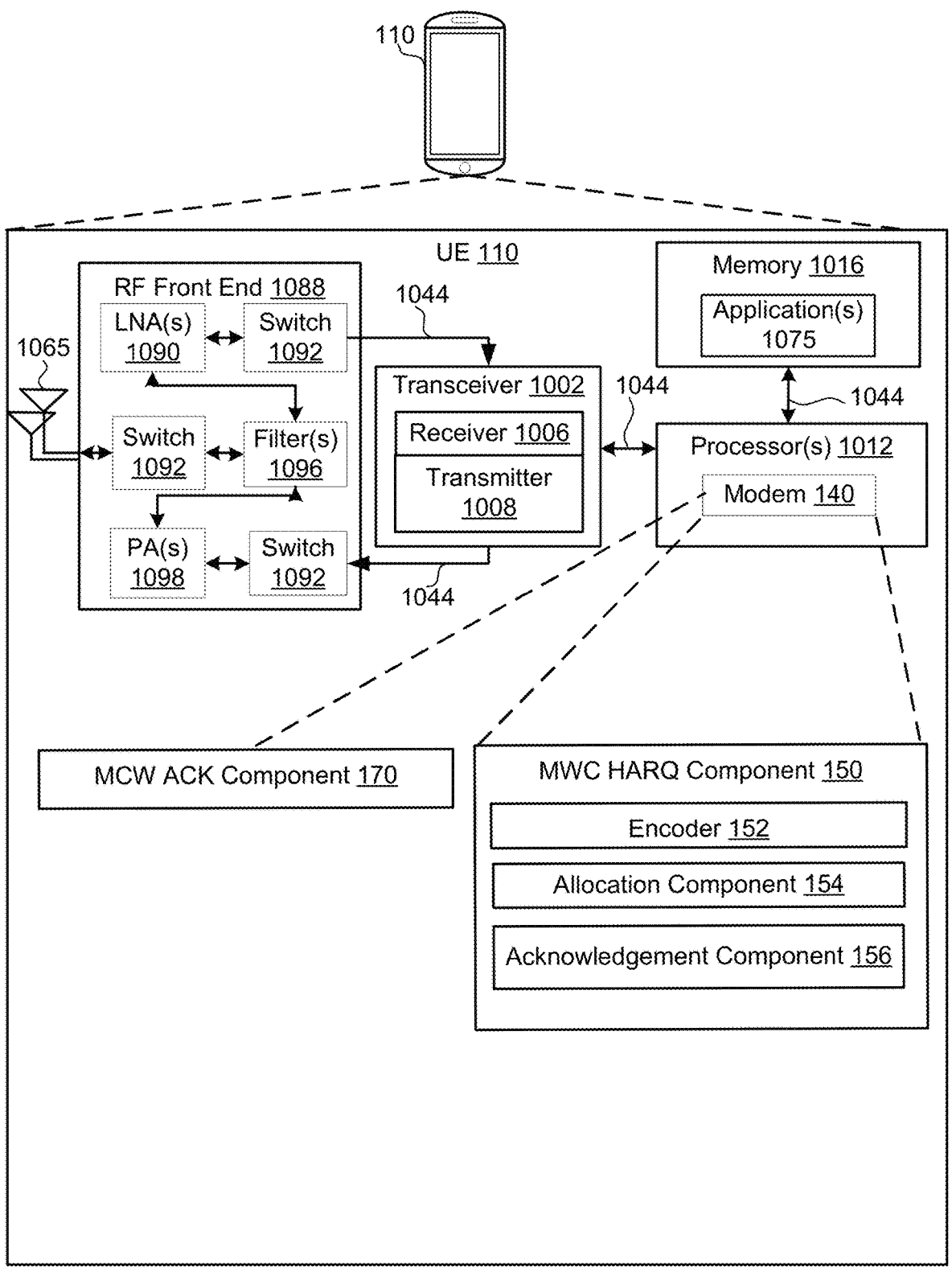
FIG. 10 is a schematic diagram of example components of the UE of FIG. 1.

Referring to FIG. 10, one example of an implementation of UE 110 may include a variety of components, some of which have already been described above, but including components such as one or more processors 1012 and memory 1016 and transceiver 1002 in communication via one or more buses 1044, which may operate in conjunction with modem 140 and MCW HARQ component 150 to enable one or more of the functions described herein related to retransmission using multiple code words. Further, the one or more processors 1012, modem 1014, memory 1016, transceiver 1002, RF front end 1088 and one or more antennas 1086, may be configured to support voice and/or data calls (simultaneously or non-simultaneously) in one or more radio access technologies.

In an aspect, the one or more processors 1012 can include a modem 1014 that uses one or more modem processors. The various functions related to MCW HARQ component 150 may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 140 associated with MCW HARQ component 150 may be performed by transceiver 1002.

Also, memory 1016 may be configured to store data used herein and/or local versions of applications 1075 or MCW HARQ component 150 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining MCW HARQ component 150 and/or one or more of its subcomponents, and/or data associated therewith, when UE 110 is operating at least one processor 1012 to execute MCW HARQ component 150 and/or one or more of its subcomponents.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 105. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 110 may include RF front end 1088, which may operate in communication with one or more antennas 1065 and transceiver 1002 for receiving and transmitting radio transmissions, for example, wireless communications transmitted by at least one base station 105 or wireless transmissions transmitted by UE 110. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and a corresponding specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1002 to operate at a specified frequency and power level based on the UE configuration of the UE 110 and the communication protocol used by modem 140.

In an aspect, modem 140 can be a multiband-multimode modem, which can process digital data and communicate with transceiver 1002 such that the digital data is sent and received using transceiver 1002. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 11:
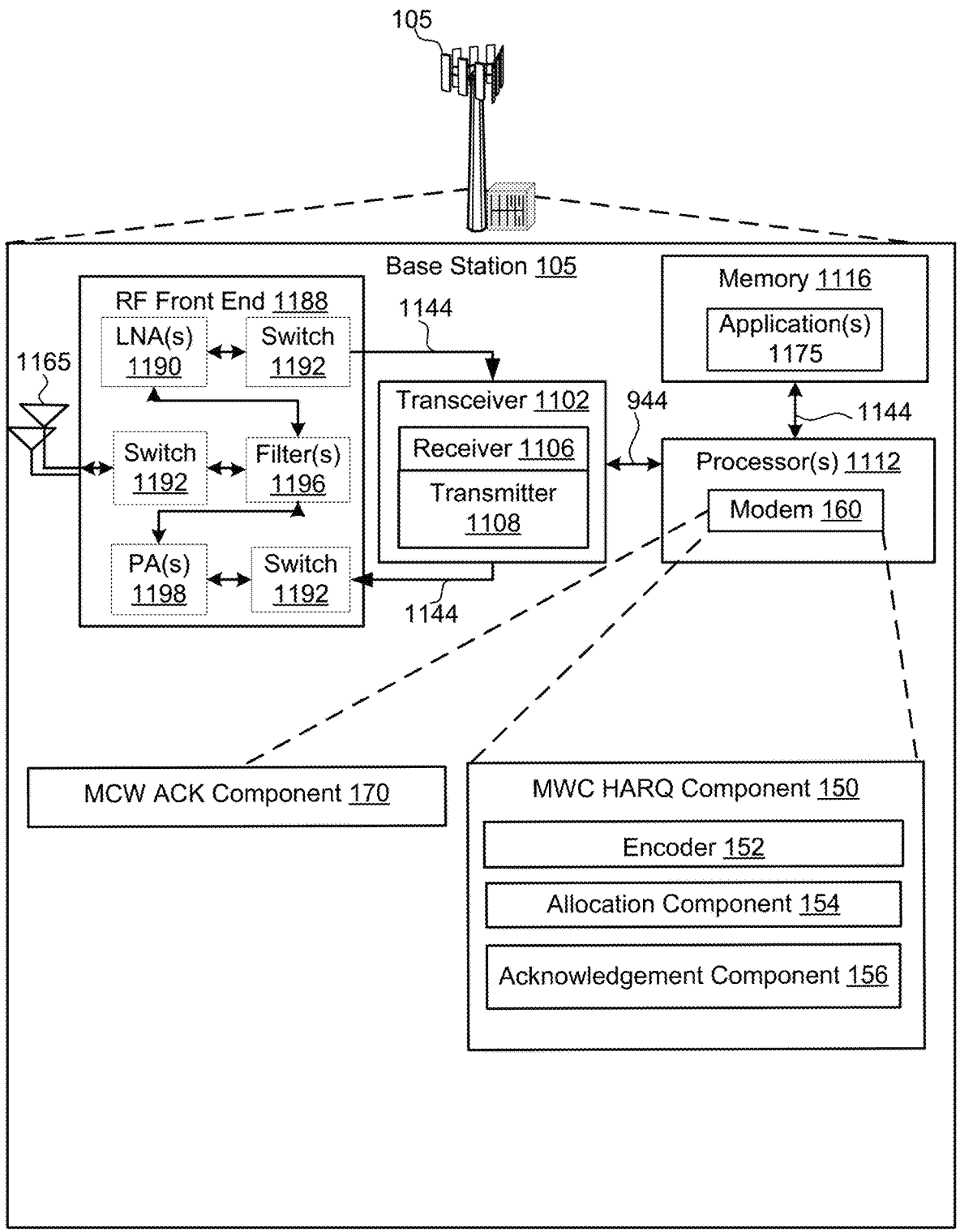
FIG. 11 is a schematic diagram of example components of the base station of FIG. 1.

Referring to FIG. 11, one example of an implementation of base station 105 may include a variety of components, some of which have already been described above, but including components such as one or more processors 1112 and memory 1116 and transceiver 1102 in communication via one or more buses 1144, which may operate in conjunction with modem 160 and MCW ACK component 170 to enable one or more of the functions described herein related to acknowledging receipt of code block groups in an MCW HARQ transmission.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   transmitting an original transmission in a hybrid automatic repeat request (HARQ) process, the original transmission having a first transport block transmitted on a first code word and a second transport block transmitted on a second code word, each transport block of the first transport block and the second transport block including multiple code blocks grouped into code block groups, wherein a first code block group of the code block groups includes a first code block of the multiple code blocks;
   receiving a negative acknowledgment in response to the original transmission, the negative acknowledgment indicating, at a level of a code block group, that a subset of the code block groups including at least the first code block group was not successfully received, the subset of the code block groups including fewer code block groups than the original transmission;
   determining a list of code block groups to be included in a retransmission based on a retransmission grant;
   calculating a nominal payload size of code words in the list of code block groups to be included in the retransmission;
   allocating the subset of code block groups or code blocks within the subset of code block groups to the first code word and the second code word proportionately according to the nominal payload size of each code word in the retransmission; and
   transmitting the subset of the code block groups on at least one of the first code word or the second code word in the retransmission in the HARQ process,
   wherein if the first code block was transmitted on the first code word in the original transmission then the first code block is transmitted on only the second code word in the retransmission, and if the first code block was transmitted on the second code word in the original transmission the first code block is transmitted on only the first code word in the retransmission.

2. The method of claim 1, wherein the retransmission includes at least one code block group from the first code word and at least one code block group from the second code word.

3. The method of claim 1, wherein the allocating comprises allocating the subset of code block groups to the first code word and the second code word proportionately according to the nominal payload size of each code word in the retransmission.

4. The method of claim 1, wherein the allocating comprises allocating code blocks within the subset of code block groups to the first code word and the second code word proportionately according to the nominal payload size of each code word in the retransmission.

5. The method of claim 2, further comprising rate matching to fill coded bits from the code blocks assigned into the first code word and the second code word into available resource elements of the first code word and the second code word.

6. The method of claim 2, further comprising:
   computing a first ratio of a payload for the first code word to a total payload and a second ratio of a payload for the second code word to the total payload;

assigning, sequentially, a first subset of the code block groups to the first code word, wherein a first sub-total payload size of the first subset of the code block groups is approximately equal to the first ratio times the total payload; and assigning, sequentially, a second subset of the code block groups to the second code word, wherein a second sub-total payload size of the second subset of the code block groups is approximately equal to the second ratio times the total payload size.

7. The method of claim 2, further comprising receiving an indication of code block groups or code blocks to be allocated to the first code word; and allocating the code block groups or code blocks according to the indication.

8. The method of claim 1, wherein a second retransmission includes a new transport block and at least one retransmission code block group from the first code word or from the second code word.

9. The method of claim 8, further comprising receiving a downlink control information (DCI) for the second retransmission including two new data indicators (NDI), wherein one of the NDI has a same value as a corresponding NDI for the original transmission and the other of the NDI has a different value than a corresponding NDI for the original transmission to indicate a corresponding transport block is new.

10. The method of claim 9, wherein the at least one retransmission code block group is transmitted in the same code word as when the code block group was originally transmitted and new code blocks of the new transport block are placed in the other code word corresponding to a different value for the NDI.

11. The method of claim 8, wherein the new transport block includes a same number of code block groups as the corresponding first transport block or the second transport block.

12. An apparatus, comprising:
a memory;
a transceiver; and
a processor in communication with the memory and the transceiver, wherein the processor is configured to:
transmit an original transmission in a hybrid automatic repeat request (HARD) process via the transceiver, the original transmission having a first transport block transmitted on a first code word and a second transport block transmitted on a second code word, each transport block of the first transport block and the second transport block including multiple code blocks grouped into code block groups, wherein a first code block group of the code block groups includes a first code block of the multiple code blocks;
receive, via the transceiver, a negative acknowledgment in response to the original transmission, the negative acknowledgment indicating, at a code block group level, that a subset of the code block groups including at least the first code block group was not successfully received, the subset of the code block groups including fewer code block groups than the original transmission;
determine a list of code block groups to be included in a retransmission based on a retransmission grant and calculate a nominal payload size of code words in the list of code block groups to be included in the retransmission;
allocate the subset of code block groups or code blocks within the subset of code block groups to the first code word and the second code word proportionately according to the nominal payload size of each code word in the retransmission; and
transmit the subset of the code block groups on at least one of the first code word or the second code word in the retransmission in the HARQ process via the transceiver,
wherein if the first code block was transmitted on the first code word in the original transmission then the first code block is transmitted on only the second code word in the retransmission, and if the first code block was transmitted on the second code word in the original transmission the first code block is transmitted on only the first code word in the retransmission.

13. The apparatus of claim 12, wherein the retransmission includes at least one code block group from the first code word and at least one code block group from the second code word.

14. The apparatus of claim 12, wherein the processor is configured to allocate the subset of code block groups to the first code word and the second code word proportionately according to the nominal payload size of each code word in the retransmission.

15. The apparatus of claim 12, wherein the processor is configured to allocate code blocks within the subset of code block groups to the first code word and the second code word proportionately according to the nominal payload size of each code word in the retransmission.

16. The apparatus of claim 13, wherein the processor is configured to rate match to fill coded bits from the code blocks assigned into the first code word and the second code word into available resource elements of the first code word and the second code word.

17. The apparatus of claim 13, wherein the processor is configured to:
compute a first ratio of a payload for the first code word to a total payload and a second ratio of a payload for the second code word to the total payload;
assign, sequentially, a first subset of the code block groups to the first code word,
wherein a first sub-total payload size of the first subset of the code block groups is approximately equal to the first ratio times the total payload; and
assign, sequentially, a second subset of the code block groups to the second code word, wherein a second sub-total payload size of the second subset of the code block groups is approximately equal to the second ratio times the total payload size.

18. The apparatus of claim 13, wherein the processor is configured to:
receive, via the transceiver, an indication of code block groups or code blocks to be allocated to the first code word; and
allocate the code block groups or code blocks according to the indication.

19. The apparatus of claim 12, wherein a second retransmission includes a new transport block and at least one retransmission code block group from the first code word or from the second code word.

20. The apparatus of claim 19, wherein the processor is configured to receive a downlink control information (DCI) for the second retransmission including two new data indicators (NDI), wherein one of the NDI has a same value as a corresponding NDI for the original transmission and the other of the NDI has a different value than a corresponding NDI for the original transmission to indicate that a corresponding transport block is new.

21. The apparatus of claim 20, wherein the at least one retransmission code block group is transmitted in the same code word as when the code block group was originally transmitted and new code blocks of the new transport block are placed in the other code word corresponding to the different value for the NDI.

22. The apparatus of claim 19, wherein the new transport block includes a same number of code block groups as the corresponding first transport block or the second transport block.

23. An apparatus, comprising:
  means for transmitting an original transmission in a hybrid automatic repeat request (HARD) process, the original transmission having a first transport block transmitted on a first code word and a second transport block transmitted on a second code word, each transport block of the first transport block and the second transport block including multiple code blocks grouped into code block groups, wherein a first code block group of the code block groups includes a first code block of the multiple code blocks;
  means for receiving a negative acknowledgment in response to the original transmission, the negative acknowledgment indicating, at a code block group level, that a subset of the code block groups including at least the first code block group was not successfully received, the subset of the code block groups including fewer code block groups than the original transmission, wherein the means for receiving the negative acknowledgment is configured to determine a list of code block groups to be included in a retransmission based on a retransmission grant, and; and
  means for transmitting the subset of the code block groups on at least one of the first code word or the second code word in the retransmission in the HARQ process, wherein the means for transmitting is configured to calculate a nominal payload size of code words in the list of code block groups to be included in the retransmission and allocate the subset of code block groups to the first code word and the second code word proportionately according to the nominal payload size of each code word in the retransmission,
  wherein if the first code block was transmitted on the first code word in the original transmission then the first code block is transmitted on only the second code word in the retransmission, and if the first code block was transmitted on the second code word in the original transmission the first code block is transmitted on only the first code word in the retransmission.

24. The apparatus of claim 23, wherein the retransmission includes at least one code block group from the first code word and at least one code block group from the second code word.

25. The apparatus of claim 24, wherein means for receiving the negative acknowledgment is configured to determine a list of code block groups to be included in the retransmission based on a retransmission grant, and wherein the means for retransmitting is configured to calculate a nominal payload size of code words in the list of code block groups to be included in the retransmission.

26. The apparatus of claim 23, wherein a second retransmission includes a new transport block and at least one retransmission code block group from the first code word or from the second code word.

27. The apparatus of claim 23, further comprising means for receiving a downlink control information (DCI) for the second retransmission including two new data indicators (NDI), wherein one of the NDI has a same value as a corresponding NDI for the original transmission and the other of the NDI has a different value than a corresponding NDI for the original transmission to indicate a corresponding transport block is new.

28. A non-transitory computer-readable medium storing computer code executable by a processor for wireless communications, the computer-readable medium comprising code to:
  transmit an original transmission in a hybrid automatic repeat request (HARQ) process, the original transmission having a first transport block transmitted on a first code word and a second transport block transmitted on a second code word, each transport block of the first transport block and the second transport block including multiple code blocks grouped into code block groups, wherein a first code block group of the code block groups includes a first code block of the multiple code blocks;
  receive a negative acknowledgment in response to the original transmission, the negative acknowledgment indicating, at a code block group level, that a subset of the code block groups including at least the first code block group was not successfully received, the subset of the code block groups including fewer code block groups than the original transmission;
  determine a list of code block groups to be included in the retransmission based on a retransmission grant and calculate a nominal payload size of code words in the list of code block groups to be included in the retransmission;
  allocate the subset of code block groups or code blocks within the subset of code block groups to the first code word and the second code word proportionately according to the nominal payload size of each code word in the retransmission; and
  transmit the subset of the code block groups on at least one of the first code word or the second code word in a retransmission in the HARQ process,
  wherein if the first code block was transmitted on the first code word in the original transmission then the first code block is transmitted on only the second code word in the retransmission, and if the first code block was transmitted on the second code word in the original transmission the first code block is transmitted on only the first code word in the retransmission.

* * * * *